UNITED STATES PATENT OFFICE.

HANS M. OLSON, OF BEAUMONT, CALIFORNIA.

WATERPROOF CONCRETE COMPOSITION.

1,109,540.  Specification of Letters Patent.  Patented Sept. 1, 1914.

No Drawing.  Application filed August 26, 1912.  Serial No. 716,964.

*To all whom it may concern:*

Be it known that I, HANS M. OLSON, a citizen of the United States, residing at Beaumont, in the county of Riverside and State of California, have invented a new and useful Improvement in a Waterproof Concrete Composition, of which the following is a specification.

This invention relates to compositions of matter technically called concrete, and its principal object is to provide greater tensile strength and toughness to concrete structures as formed from cement, namely aggregate and a mixing medium.

It is also an object to provide a concrete that will be water proof.

It is a further object to provide an emulsion to be used to mix with the "dry concrete."

Heretofore concrete has been formed from a mixture of Portland or other cement mixed with sand, gravel stone or other aggregate in different proportions to which has been added water till the mixture has been properly incorporated, and then allowed to cure. The curing process requires an unusual amount of skill on the part of the attendant, and the result obtained under the best treatment, which would require entire immersion in water many hours, results in a structure that is porous enough to absorb or permit water to pass through with little tensile strength and liable to fail or crack from the compression strain.

This invention overcomes the objections as above described, in that the concrete mixed according to the process and with the ingredients described hereafter requires but slight attention, and the resulting product has greater tensile strength, is tough and will not fail or crack as the ordinary concrete.

Carrying out the invention, an emulsion is first formed consisting of lime which is started on its slaking process by the addition of a sufficient quantity of water. When considerable heat has developed by the slaking process, a heavy oil is added, preferably crude petroleum, as this latter is more economical, until the lime is slakened and will not take up any more oil.

Should the slaking process become overheated or liable to burn, more water must be added to prevent the burning. When the slaking process is complete, the emulsion is allowed to cool, and, if necessary, a sufficient amount of water is added to thin the mixture to the desired consistency which is a little less than that of cream. The emulsion is then strained to remove any lumps that may have formed, and is now ready for use. The proportions required are approximately, ten pounds of lime during the slaking will take up about one gallon of crude petroleum and one and a half gallons of water. The emulsion formed results in dividing the oil into practically imperceptible particles which are separated from contact with the cement by a coating of the lime, and do not interfere with the setting or hardening of the concrete. These particles of oil fill up the voids in the structure, and cement the entire ingredients into a solid homogeneous mass. The dry concrete is now mixed in the proportions desired depending upon the class of the structure to be built, consisting usually of cement, sand gravel or stone thoroughly mixed. To this "dry concrete" the emulsion is added in the well known manner as water has formerly been used, and the whole thoroughly mixed until the required consistency is obtained. A mixture of this character is especially effective for water irrigating pipes, the resulting structure having the same efficiency of iron pipe of the same character, and will not require any dipping to withstand pressure. The emulsion also retards the effects of the moisture and the composition will cure perfectly without being immersed in water, and with very little or no sprinkling.

Shingles, building blocks and tile made from this composition are tough, will not crack and are waterproof without any additional process, none of which heretofore have been able to entirely render the concrete impervious to water.

What I claim is:

The herein described composition of matter consisting of lime, ten pounds, crude oil one gallon and water.

In witness that I claim the foregoing I have hereunto subscribed my name this 23rd day of July, 1912.

HANS M. OLSON.

Witnesses:
 WALTER P. KEENE,
 EARLE R. POLLARD.